United States Patent Office 3,385,832
Patented May 28, 1968

3,385,832
OXYMETHYLENE POLYMERS HAVING OLEFINIC DOUBLE BONDS IN THE POLYMER CHAIN
Brian Edmund Jennings, Welwyn, and John Brewster Rose, St. Albans, England, assignors to Imperial Chemical Industries Limited, London, England, a corporation of Great Britain
No Drawing. Continuation-in-part of application Ser. No. 244,021, Dec. 12, 1962. This application Sept. 28, 1964, Ser. No. 399,910
3 Claims. (Cl. 260—73)

The present invention relates to a process for the preparation of oxymethylene polymers and to the oxymethylene polymers so prepared. It is a continuation-in-part of our application, Ser. No. 244,021, filed Dec. 12, 1962, now abandoned.

Oxymethylene polymers, sometimes known as polyoxymethylenes, are polymers having repeating units of the structure —OCH$_2$— and may be derived, for example, for example, from the polymerisation of formaldehyde, e.g. as described in British patent specification 748,836, or from the polymerisation of its cyclic trimer trioxane, for instance as described in British patent specification 877,820.

Homopolyoxymethylenes are thermally unstable and degrade by at least two mechanisms. The first involves depolymerisation from the thermally unstable terminal oxymethylene hydroxide (—OCH$_2$OH) groups and occurs even at moderate temperatures. The second, requiring more severe conditions, involves chain scission followed by depolymerisation from the ruptured ends. Under severe conditions, the homopolymers may be depolymerised completely.

In order to avoid or reduce the chances of degradation at moderate temperatures by depolymerisation from the terminal oxymethylene hydroxide groups, it has been proposed to react the homopolymers with compounds that will substitute for the hydroxyl groups end groups which are more stable to elevated temperatures, for instance the polymer may be reacted with acid anhydrides, α-chloroalkyl ethers, alkyl halides, isocyanates and epoxides. However, the products are still subject to degradation by chain scission and once the polymer chain has been ruptured, the two broken halves may still depolymerize completely under forcing conditions. In order to reduce the effects of such degradation it has been proposed to copolymerise trioxane with other saturated aliphatic cyclic ethers, principally dioxolane. The copolymerisation has the effect of introducing into the polymer chain groups having adjacent carbon atoms in the chain itself. Thus, the copolymers contain both oxymethylene (—OCH$_2$—) groups and divalent organic groups (—OR—) having adjacent carbon atoms and derived from the comonomer. For instance, in the case where dioxolane is the comonomer, the divalent organic groups have the structure —OCH$_2$CH$_2$—. When the copolymer is subjected to conditions causing chain scission, depolymerisation from the ruptured ends proceeds only as far as the first —OR— group in the chain and there halts, thus preventing total depolymerisation.

Homopolyoxymethylenes are also crystalline and like the polyamides they suffer from sharply defined melting points; that is, the difference between the temperature at which the polymer starts to melt and that at which it is wholly molten is small. Because of this, the conditions required for processing the polymers (e.g. by moulding or extrusion) are critical and in particular this causes difficulty in the manufacture and orientation of films. Copolymerisation has the additional advantage of widening the melting range, thus reducing the criticality of the operating conditions required for successful fabrication.

However, introduction into the oxymethylene polymer chain of the residues of other saturated cyclic ethers also has the undesirable tendency of affecting adversely the unique and commercially attractive combination of physical properties (toughness, rigidity and high melting point) that is associated with homopolyoxymethylenes.

It is an object of the present invention to provide oxymethylene polymers which in high molecular weight form have good thermal stability, a useful melting range and yet retain a high ultimate melting point. It is a further object of the invention to provide oxymethylene polymers which may be chemically modified and may be crosslinked.

According to the present invention we provide a copolymer comprising the product of polymerising a cyclic oligomer of formaldehyde, preferably trioxane, with a cyclic ether having the structure:

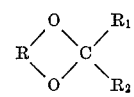

where R is a divalent radical having a monoethylenically unsaturated chain of from 4 to 5 carbon atoms linking the oxygen atoms of the ether, each of the remaining valencies of said carbon atoms being satisfied by a monovalent radical selected from the group consisting of hydrogen atoms, halogen atoms (for instance, chlorine, bromine, fluorine and iodine) and alkyl groups having up to 2 carbon atoms and R$_1$ and R$_2$ are each selected from the group consisting of hydrogen atoms and monovalent hydrocarbon radicals having from 1 to 6 carbon atoms.

Of the cyclic oligomers of formaldehyde, we prefer trioxane because of its ready availability. Tetraoxymethylene is an example of another such cyclic oligomer.

The cyclic ethers may be derived by the reaction of a suitable aliphatic ethylenically unsaturated diol with an aldehyde or ketone. Examples of aldehydes and ketones that may be used are formaldehyde, acetaldehyde, propionaldehyde, n-butyraldehyde, iso-butyraldehyde, n-valeraldehyde, benzaldehyde, acetone, methyl ethyl ketone, di-ethyl ketone, acetophenone and benzophenone. The ethers derived from formaldehyde are formals, those derived from other aldehydes are acetals and those derived from ketones are ketals.

Aliphatic ethylenically unsaturated diols that may be used to form our ethers are those having a monoethylenically unsaturated chain of 4 to 5 carbon atoms linking the two hydroxyl groups. They include, for example, butene-1,4-diols, pentene-1,5-diols and their derivatives in which one or more of the hydrogen atoms bound to the carbon atoms have been replaced by halogen atoms, methyl groups and ethyl groups. Examples are but-2-ene-1,4-diol, pent-2-ene-1,4-diol, hex-3-ene-2,5-diol, oct-4-ene-3,6-diol, 1,4-dichlorobut-2-ene-1,4-diol, 2,5-dimethylhex-3-ene-2,5-diol and 3,6-dimethyloct-4-ene-3,6-diol. Of these, we prefer those diols having ethylenic unsaturation in the chain between two methylene hydroxide (—CH$_2$OH)

groups because the cyclic ether derivatives of these compounds may be copolymerised with trioxane with ease. But-2-ene-1,4-diol is our preferred diol because of its ease of manufacture from readily available materials.

Our preferred ethers are the formals and acetals of but-2-ene-1,4-diol, particularly 1,3-dioxep-5-ene and 2-isopropyl-1,3-dioxep-5-ene, because of their ease of copolymerisation with trioxane. The formal may be copolymerised to give very useful products of high molecular weight, suitable for extrusion and moulding.

Our copolymers are formed of units having the structure —OCH$_2$— and units having the structure

—OROC(R$_1$R$_2$)— where R, R$_1$ and R$_2$ are as hereinbefore defined.

In order to obtain products of good physical properties, it is preferred that at least 50% of the units forming the polymer chain of the copolymer are oxymethylene (—OCH$_2$—) units. Those in which at least 80% of the units are oxymethylene units are generally suitable as thermoplastic materials. Copolymers in which at least 90% of the units are oxymethylene units are generally tough, rigid and very suitable for moulding. To obtain products showing a useful improvement in thermal stability over the homopolymers, we prefer that at least 0.1% and generally at least 0.4% of the units forming the polymer chain are other than oxymethylene units. Copolymers in which from 95 to 98.5% of the units are oxymethylene units have a very useful combination of thermal stability, melting range, toughness and rigidity and are very useful moulding and extrusion materials.

Copolymers with polymer chains containing less than 80% of oxymethylene units tend to have substantially reduced rigidity and softening point and, as the amount of these units in the copolymers increases further, tend to become waxy; they are more suitable as plasticisers, lubricants and additives for lubricants, polishes, viscosity depressants and the like.

When considering the composition of our polymers, it must be remembered that where the comonomer is a cyclic formal the units forming the polymer chain are —OCH$_2$— units and —OROCH$_2$— units. In such cases the —OCH$_2$— units of the —OROCH$_2$— units must be added to the —OCH$_2$— units derived from the trioxane in order to calculate the total percent of —OCH$_2$— units in the polymer chain.

Particularly useful polymers are obtained when their molecular weight is at least 15,000 and preferably 20,000 or more. A molecular weight of 20,000 is approximately equivalent to an Inherent Viscosity of 1.0 as measured as a 0.5% solution in p-chlorophenol containing 2% of α-pinene at 60° C.

Further according to the present invention we provide a process for the preparation of high molecular weight oxymethylene polymers which comprises subjecting to a temperature of at least 0° C. a mixture comprising (i) trioxane, (ii) from 0.003 to 3 moles per mole of trioxane of a cyclic ether having the structure:

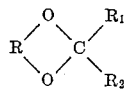

as hereinbefore defined and (iii) from 0.0001 to 0.1 part of an electrophilic catalyst per 100 parts of the combination of trioxane and cyclic ether and recovering a copolymer of trioxane and said cyclic ether.

The process of the invention not only provides a method of obtaining copolymers having a most useful combination of wide melting range, high ultimate melting point, rigidity and toughness but is a useful method for inserting into the polymer chain ethylenically unsaturated units the presence of which allows the polymer to be chemically modified or cross-linked and also encourages the adhesion of paint to an article fabricated from the polymer. The latter property is particularly advantageous where the polymer is to be used in metal replacement fields.

The polymerisation may be effected in bulk or in solution.

Where a bulk process is used, the polymerisation is normally carried out at a temperature at which the polymerisable material is in a molten or substantially molten form. However, for the preparation of high molecular weight polymers, e.g. polymers of molecular weight greater than 15,000 the polymerisation temperature should not be so high as to allow substantial depolymerisation to occur. It is preferred, on the other hand, that a temperature is used at which the cyclic ether is soluble in trioxane.

It is preferred to effect the polymerisation at temperatures of from about 0° to about 100° C. and preferably 50–90° C. but higher temperatures may be used if desired. Where the polymerisation is effected under conditions of shear, for example in a mixer, it is often desirable to use polymerisation temperatures as high as 110° C. Where it is desired to use temperatures of above about 115° C. (the boiling point of trioxane) the polymerisation should be carried out under super-atmospheric pressure.

Where the polymerisation is effected in solution, the cyclic ether is preferably one which is soluble in the mixture of trioxane and solvent. Suitable solvents include hydrocarbons such as hexane, heptane, cyclohexane, benzene, toluene and xylene and chlorinated hydrocarbons such as methylene chloride, chloroform or carbon tetrachloride. It is preferred to effect the polymerisation at a temperature high enough to prevent the polymerisable compound from crystallising out of solution but at a temperature not above the boiling point of the solution at the working pressure. The polymerisation may be effected under super-atmospheric pressure if desired and this is useful since it permits higher temperatures to be used.

The polymerisation may take place satisfactorily in the presence of very small amounts of water such as would be found as impurities in commercial grades of the oligomer or the cyclic ether but, as is known to polymerisation experts, if good yields of high molecular weight material are to be obtained it is preferred to remove substantially all traces of water from the polymerisation medium. We prefer that the polymerisation medium contains less than 0.05% by weight of water, more preferably less than 0.03%.

Any electrophilic catalyst known for the polymerisation of trioxane may be used in the polymerisation. Such catalysts may be known, alternatively, as cationic catalysts or initiators. Examples are found in U.S. specification 2,795,571, U.S. specification 2,947,727, U.S. specification 2,947,728, U.S. specification 2,989,511, French patent specification 1,221,148, Belgian patent specification 585,-335, Belgian patent specification 585,980 (in particular) and British patent specification Nos. 875,558; 877,820 and 878,163. More particularly, these include Lewis acids, Friedel-Craft catalysts, elementary iodine, perchloric acid and acetyl perchlorate. Of these, Lewis acids which are halides are preferred and boron trifluoride in particular has been found to give very good results. The boron trifluoride may be used in unmodified form or as one of its coordination complexes with an oxygen, sulphur, nitrogen or phosphorus compound (for instance as described in U.S. specification No. 2,989,511, British patent specification No. 877,820 and Belgian patent specification No. 585,980.) Examples of such complexes include those with water, with organic compounds having an oxygen or sulphur atom which may act as the donor atom (e.g. alcohols, phenols, ethers, acids, anhydrides, esters, ketones, aldehydes, thioethers and mercaptans), with organic compounds having a trivalent nitrogen or phosphorus atom (e.g. aryl amines, heterocyclic nitrogen compounds, amino acids, hydrazides, amides, phosphine and organic phosphines) and fluoborate complexes such as those with diazonium and oxonium compounds. Where the catalyst is a co-ordination complex, it is to be understood that it should be used in amounts equivalent to those required to yield from 0.0001 to 0.1 part of the Lewis acid per 100 parts by weight of monomeric material.

The molecular weight of the products of the invention may be controlled by adding chain transfer agents to the polymerisation medium, suitable chain transfer agents being chlorinated hydrocarbons, alkyl acetates and acetals. It is preferred to effect the polymerisation in the substantial absence of oxygen.

Particularly useful products, in which from about 90 to about 99.6% of the units in the chain are oxymethylene units, are obtained by polymerising from about twelve one thousandths to about three eighths of a mole of cyclic ether per mole of trioxane. Products having the optimum combination of melting range, rigidity, toughness and processability are generally formed by polymerising from about five one hundredths to about one sixth of a mole of cyclic ether per mole of trioxane.

We prefer that the polymerisation is effected in bulk or in the presence of only very small amounts of solvent since then the necessity of expensive solvent extraction and recovery processes may be avoided.

In a process according to our invention, the cyclic ether and trioxane are first carefully dried and are then added to a pre-dried reactor such as a steel bomb. The container may be swept with nitrogen gas and the catalyst is then added alone or as a solution in an inert organic solvent. The container is sealed and heated to about 65° C. and the polymerisation is allowed to take place. After the required time, the polymerisation is brought to a conclusion and the reactor will contain the polymeric products and catalyst residues and possibly unreacted trioxane and unreacted cyclic ether.

In the production of high polymers as described above the polymerisation temperature is normally less than the softening point of the polymers. As the polymers formed are usually insoluble in the mixture of monomers, the product of a bulk polymerisation process is usually a crumbly mass. To ensure good mixing of the polymerisation and so full growth of the polymer chains, and to form an easily worked powder at the end of the polymerisation, it is desirable to apply shear to the polymerisation mixture during the bulk process.

Conditions of shear may be imposed by any suitable means, such as intense stirring or agitation and the polymerisation may, for example, be carried in a simple mixer. A vessel rotatable on a horizontal axis and having within it freely rolling spheres, rods or the like as described in the specification of British Patent No. 749,086 may also be used.

Very good results may be obtained if the polymerisation ingredients are fed into a continuous mixer having a screw with an interrupted thread placed in a cylindrical body, the inside surface of which has rows of protruding teeth. The screw is made both to rotate and reciprocate so that the teeth on the wall of the cylindrical body pass through the breaks in the screw thread. In this case the polymerisation mass moves forward along a path which has a generally helicoidal shape with an alternate forward and backward movement as it moves towards the outlet. The use of this mixer also has the advantage in that a continuous process may be used. A suitable machine is described in the specification of British Patent No. 626,067. A sigma-bladed mixer is also suitable.

Therefore, in another process according to the invention the cyclic ether and trioxane are first carefully dried and then added together with the catalyst to the pre-dried mixer which is heated to the desired temperature. The polymerisation takes place in the mixer which may be pressurised if desired and the polymer is removed from the other end of the mixer in the form of a slurry or powder.

The material so obtained will contain the polymeric product, catalyst residues and possibly unreacted trioxane and unreacted cyclic ether; the polymeric product comprises the copolymer of trioxane and the cyclic ether and possibly incidental polyoxymethylenes derived from the homopolymerisation of the trioxane. The catalyst residues are preferably removed as soon after the polymerisation as possible since their presence may also catalyse the decomposition of the polymeric product; they may be removed simply by washing the mix with an aqueous, preferably an aqueous alkaline wash. For example, the mix may be washed with a dilute ammoniacal or caustic soda solution. As is well known, solvents may also be used for removing these catalysts. During their removal the polymer may also be stabilised as is set out below.

The unreacted trioxane and any of the cyclic ether may be separated from the copolymer by any suitable means such as filtration or solvent extraction. Since trioxane is soluble in most common solvents, it may be separated by a solvent extraction process, e.g. at the same time as the catalyst is removed. The cyclic ether may also be extracted by a solvent extraction process.

The presence of the incidental polyoxymethylene may adversely affect the stability of the material and this may be remedied either by preferential destruction or by end-group stabilisation of this polyoxymethylene.

The copolymers prepared by the process of the invention contain both oxymethylene groups derived from the trioxane and divalent organic radicals derived from the cyclic ether and the copolymer chains may therefore be ended by terminal groups of the structure —O—CH$_2$OH or they may be ended by other groups derived from the cyclic ether. Where a copolymer chain is terminated by a —O—CH$_2$OH group, which is readily detachable on heating or under alkaline conditions, the end of the chain may be represented as having the structure —R—O—(CH$_2$O)$_n$H where $n$ is a whole number and R is the alkylidene radical derived from the cyclic ether and nearest to the end of the polymer chain. On subjecting the copolymer chain to a thermal or alkaline degradation reaction, the —O—CH$_2$OH group will be detached and the oxymethylene group immediately behind it (if any) will receive a hydrogen atom and become an —O—CH$_2$OH group and the chain will now have the structure —R—O—(CH$_2$O)$_{n-1}$H This next —O—CH$_2$OH group now is attacked and the degradation of the chain will continue until the

—R—O— group is reached. Since the —R—OH group is relatively much more resistant to detachment, the degradation reaction will normally halt there. The copolymer may therefore be stabilised either by subjecting it to such a degradation reaction or by end-group stabilising it. It will be appreciated that under such degradation conditions, any homopolyoxymethylene that may be present will eventually be degraded completely if conditions are sufficiently forcing.

Where it is preferred to destroy the incidental polyoxymethylene and to remove the unstable oxymethylene end-groups from the copolymer, this may be done simply by heating the mixture in an inert atmosphere, e.g. under nitrogen at a temperature of about 160° C. or above after the catalyst residues have been removed; it is preferred not to use too high a temperature since otherwise the copolymer may also be degraded to an undesirable extent. The preferential destruction may also be aided by the addition of a weak acid such as formic acid or acetic acid or an alkali such as caustic soda but the latter is not to be preferred as it may tend to cause undesirable degradation of the copolymer and may convert the formaldehyde so generated into sugar-like polymers.

Stabilisation by removal of these unstable entities may be carried out in an alkaline process for removing the polymerisation catalyst and in this preferred process, the polymer is treated with a basic, preferably ammoniacal, solution at moderately elevated temperatures. However, it is believed that the action of the basic solution may be merely topochemical (see, for instance, pages 231 and 232 of Die Hochmolekularen Organischen Verbindungen by Staudinger, 1932) and for an efficient reaction the polymer is preferably treated either in a finely divided state or, more preferably, in solution and the formation of a solution may be encouraged by carrying out the process under elevated pressure and temperature. The advantage of such a process is that in one step the catalyst, unreacted trioxane and incidental homopolyoxymethylene may all be removed from the polymer. When the solution is cooled, the desired stable oxymethylene copolymer comes out of solution and may be separated.

Instead of a strong, ammoniacal solution, a solution of an amine, or an amide or an alkali hydroxide such as sodium or potassium hydroxide or a salt of a strong base and weak acid such as sodium carbonate or sodium acetate may be used alone or in combination under similar conditions. The solvent may be water or preferably a mixture of water with a water-miscible alcohol (particularly methanol), with a water-miscible ketone such as acetone or with an ether. The presence of the organic material helps to bring the polymeric material into solution.

When on the other hand it is preferred to end-group stabilise the incidental homopolyoxymethylene and the oxymethylene end-groups of the copolymer, the mixture may be reacted with any suitable compound which will substitute for the terminal hydroxy group of the polyoxymethylene or copolymer other groups (such as acetate, ether or urethane groups) which are relatively more stable. The end-group stabilisation may be effected for example, by reacting the copolymer mixture with a carboxylic acid, a carboxylic acid ester, a carboxylic acid anhydride, an alcohol, an acetal, an isocyanate, an ortho ester, a ketal, an ortho carbonate, a ketone, a ketone/ketone transformation product, an ether or their substituted derivatives, an epoxide such as ethylene oxide or propylene oxide, an olefine such as butadiene or styrene, an alkyl halide such as tertiary butyl chloride or a vinyl monomer such as acrylonitrile or acrolein. Reaction with a carboxylic acid anhydride such as acetic anhydride is preferred.

The copolymer may be further stabilised against degradation by the addition of any suitable stabiliser for the polyoxymethylene. Suitable stabilisers include, for example, hydrazines, amines, amidines, amides, polyamides, phenols, substituted phenols, polynuclear phenols (particularly alkylene bis-phenols), ureas, thioureas, quinones such as those described in our copending application Ser. No. 236,716 now abandoned and certain aromatic nitro compound, such as those described in our copending application Ser. No. 252,555, now U.S. Patent No. 3,261,805 alone or in combination. Stabilisers against attack by ultra violet light, such as hydroxy-substituted benzophenones, may also be incorporated into the polymer. Fillers, pigments, mould release agents, lubricants, plasticisers, and the like may also be added and the polymer may be blended with other compatible polymeric materials.

The copolymers of the present invention differ from the products of copolymerising trioxane with the cyclic ethers known hitherto. For equivalent comonomer contents, the ultimate melting points of our specified copolymers are generally higher than those of the known copolymers while the melting range is greater. Alternatively, to match the melting range of a known copolymer, less comonomer is required in our specified copolymers, thus reducing the undesirable modifications to physical properties caused by introducing comonomer residues into the oxymethylene chain.

This is exemplified by a series of experiments performed to compare the properties of copolymers formed from the typical prior art comonomer, dioxolane, and the cyclic formal of but - 2-ene-1,4-diol (1,3-dioxep-5-ene), representing our specified class of comonomer. The amount of each monomer (calculated as mole percent based on the molar amount of $OCH_2$ units present in the form of trioxane in the polymerisation mixture) and the melting range of the appropriate copolymer after it had been separated from the reaction mixture and catalyst residues, treated to the ammoniacal wash described hereinbefore and pressed into a film is compared for each polymerisation in the table below.

| Amount of comonomer in polymerisation mixture (mole percent) | 0.5 | 1.0 | 1.5 | 2.5 | 5.0 |
|---|---|---|---|---|---|
| Melting range of copolymer $T_{50}-T_m$ in ° C.: | | | | | |
| Dioxolane | | | 156-160 | 148-155 | 152-157 |
| 1,3-dioxep-5-ene | 153-160 | 149-156 | | 139-151 | 127-152 |

The $T_m$ and $T_{50}$ of the copolymer are measured by placing a thin film of copolymer 10–60$\mu$ in thickness (which has been fused at 20–30° C. above the melting point and then cooled at a rate of 6° C. per hour) on a glass slide and under a glass cover, raising its temperature by 1° C. per minute on a hot stage between the crossed polars of a microscope and measuring the birefringence of the sample as the temperature is increased. The birefringence may be measured by observation of the intensity of light allowed to pass the analyser of the microscope and this intensity may be recorded suitably by a photo-conductor. $T_m$ (the ultimate melting point) is the temperature at which the light intensity has fallen from its initial value at room temperature to a constant minimum level and $T_{50}$ is the temperature at which the light intensity has fallen to exactly mid-way between these two levels. The range $T_{50}-T_m$ is directly indicative of the melting range of the copolymer.

From the table it may be seen that the molar amount of comonomer required to give a desired melting range (say 7° C.) is very much less in the case of 1,3-dioxep-5-ene than in the case of dioxolane and that for such a melting range, the copolymer from 1,3-dioxep-5-ene has a melting point several degrees higher than the copolymer from dioxolane.

The drop in melting point that occurs with the introduction of our copolymer and the wide melting range both indicate that our specified copolymers are of the random variety and are not block copolymers. Block copolymers having such small amounts of the cyclic ether would be expected to have melting points even closer to that of the homopolymer derived from trioxane and to have a narrower melting range.

Because of the width of melting range of our copolymers, the conditions required for moulding or otherwise fabricating them in massive form are not as critical as those required for the homopolymer and they lend themselves, therefore, to easier fabrication. Of particular interest is the orientation of films where it is desirable to be able to operate within as wide a range of temperatures as possible, the lower limit is governed by the minimum temperature of uniform drawing and the upper by the temperature at which flow instead of orientation occurs.

The rate of thermal degradation of the copolymers, particularly of those which have been stabilised by the methods described, is also less than that of copolymers of trioxane having equivalent amounts of dioxolane. For example, we found that the rate of loss in weight at 222° C. of a copolymer formed by polymerising trioxane with 2.5 mole percent (calculated on the amount of $CH_2O$ present as trioxane) of dioxane, after the ammoniacal wash treatment described hereinbefore, is 0.15% per minute while the equivalent rate for the copolymer obtained by polymerising trioxane with 2.5 mole percent (calculated on $CH_2O$ present as trioxane) of 1,3-dioxep-5-ene, after the same ammoniacal wash treatment, is only 0.02% per minute. That for the homopolymer of trioxane, without the ammoniacal wash treatment which would decompose it, is about 3% per minute. (The test for estimating loss in weight was effected by placing a weighed amount of the copolymer in an ampoule having a narrow neck bent through about 180° and open to the atmosphere and immersing the ampoule so that about its lower two thirds were immersed in the vapours of boiling methyl salicylate. The ampoule is removed at regular timed intervals, cooled in ice and reweighed and the cycle is repeated. The tests are carried out over a period of at least 20 minutes, generally at least 100 minutes. Some of these tests were carried out under an atmosphere of nitrogen.) The surprising stability of our copolymers at temperatures well in excess of their melting points makes them eminently suitable in the manufacture of articles which may be subjected during their life to elevated temperature (for example as insulants in electrical switch gear).

Our copolymers in which at least 90% of the units in the chain are oxymethylene groups are tough and dimensionally stable at or above room temperature and their very low rate of thermal degradation coupled with their unexpectedly wide melting ranges makes them particularly useful as molding materials (e.g. for use in injection moulding, compression moulding and extrusion processes) and for the melt-spinning and casting of fibres and films. We prefer our mouldable polymer to have a $T_m$ of about 150° C. or more. They may also be solvent cast to given films or solvent spun to give fibres from suitable solvents, examples of which are o- and p-chlorophenol, benzyl alcohol and α-naphthol. These polymers may be used, for example, in the light engineering industry for the manufacture of small gear, rollers bearings, bushes, clips and cams; in the motor industry for the manufacture of dust covers or caps for grease nipples and bearings such as track-rod joints, lamp covers, instrument housings, low stressed gears such as oil pump gears, speedometer gears and windscreen wiper gears, self-lock nuts and other small mouldings. Our copolymers containing lesser amounts of oxymethylene groups have reduced strength, rigidity and softening point, but are suitable as plasticisers, lubricants, etc. Because of the presence of unsaturated linkages in the polymeric chain, our polymers are particularly suitable in applications where chemical modification of the products is desirable and in applications (for example where they are to replace metals) where the shaped products are to be painted.

The invention is illustrated by the following examples in which all parts are expressed as parts by weight.

Example I

A mixture of 30.6 parts of trioxane (which had been distilled from sodium and had a water content of less than 0.002%) and 3.36 parts of the cyclic monoformal of but-2-ene-1,4-diol (1,3-dioxyacylohept-5-ene) which had also been distilled from sodium was melted at 81° C. in a clean dry glass apparatus under an atmosphere of dry nitrogen. When a homogeneous melt was obtained 0.034 part boron trifluoride diethyl etherate dissolved in 2 parts of dry diethyl ether was injected into the melt. After 18 minutes polymerisation commenced and was complete in 3 minutes. The hard white polymer was removed from the vessel, ground to a coarse granular powder and refluxed with a mixture of 100 parts of "880" ammonia, 100 parts of methanol, and 800 parts of water for two hours. After filtering, washing with water, and drying at 60° C. in vacuum for 16 hours, 26.7 parts of polymer were obtained. The rate of loss in weight of this polymer at 222° C. in a nitrogen atmosphere was 1.4% per minute for the first 9% loss and thereafter 0.05% per minute. The rate of loss in weight for a homopolyoxymethylene formed from trioxane was 3.0% per minute under the same conditions.

A film which was melt pressed at 180–185° C. from the polymer was tough and highly crystalline and had a melting range as determined on a hot stage microscope of 160° C. (50% molten) to 166° C. (100% molten) whereas a homopolymer, prepared from trioxane alone under similar conditions, had a crystal melting point of 170° C.

Example II 28.7 parts of trioxane and 3.15 parts of the cyclic formal of but-2-ene-1,4-diol were polymerised as in Example I in the presence of 0.032 part boron trifluoride etherate in 0.64 part diethyl ether. The polymerisation was effected at 80.5° C. and the yield after ammonia treatment was 27.4 parts of a polymer having a breakdown rate, as measured at 222° C. in an atmosphere of nitrogen, of 0.04% per minute.

A tough film was melt pressed from the polymer at 190° C. and the polymer had a melting range of 158–165° C. Infra-red analysis indicated that the polymer contained 1.1 mole percent of but-2-ene diol residues.

Example III

The process of Example I was repeated at a temperature of 80° C. using 35.6 parts trioxane, 5.93 parts of the cyclic formal of but-2-ene-1,4-diol and 0.0395 part boron trifluoride etherate in 0.79 part diethyl ether.

A polymer was obtained having a breakdown rate after ammonia treatment, as measured at 222° C. in an atmosphere of nitrogen, of 0.37% per minute to 3% loss and thereafter 0.06% per minute. The melting range of the polymer was 147–154° C. Infra-red analysis indicated that the polymer contained 3.5 mole percent of but-2-ene diol residues.

Example IV

The process of Example I was repeated at a temperature of 80° C. using 33.5 parts trioxane, 8.93 parts of the cyclic formal of but-2-ene-1,4-diol and 0.42 part boron trifluoride etherate in 0.85 part diethyl ether. There was an induction period of 10 minutes before polymerisation commenced followed by rapid polymerisation.

A polymer was obtained having a breakdown rate, as measured at 222° C. in an atmosphere of nitrogen, of 0.065% per minute for the first 2% loss and thereafter 0.004% per minute. The melting range of the polymer was 132–146° C.

Example V

A solution of 34.2 parts trioxane and 3.76 parts of the cyclic formal of but-2-ene-1,4-diol in 100 parts of pure methylene chloride was prepared and the solution was refluxed in an atmosphere of dry nitrogen. 0.008 part of boron trifluoride diethyl etherate was added as a solution in diethyl ether. The mixture turned pale green and polymer began to precipitate out of the solution. After a further two hours refluxing the fine powder was filtered off and treated as in Example I.

24 parts of a white powder which had a breakdown rate of 0.15% per minute at 222° C. were obtained.

Example VI

A jacketed stainless steel sigma-bladed Baker-Perkins mixer fitted with a close-fitting lid having a nitrogen inlet and outlet, a rubber injection cap, a glass window, and a trap for charging the vessel without allowing air to come into contact with the reactants was used for the polymerisation. Prior to conducting the experiment the vessel was thoroughly dried by passing a rapid stream of nitrogen at about 150° C. through it for 16 hours. The vessel was then charged with 497 parts of trioxane which had been dried by passage down an activated alumina column at 70° C. and subsequent distillation from calcium hydride followed by 24.9 parts of the cyclic formal of 1,4-but-2-ene diol (1,3-dioxep-5-ene) and 66 parts of cyclohexane both of which had been dried by distillation from calcium hydride. The mixture was stirred at 60° C. and 0.0693 part of boron trifluoride di-n-butyl etherate in 0.857 part dry cyclohexane was injected into the solution. After 9 minutes the polymer began to form, within another 4 minutes a dough-like mixture was obtained and after 25 minutes the mixture was quite dry and finely powdered. The polymerisation was stopped after 2½ hours by adding a solution of 1 part of tri-n-butylamine in 300 parts of methyl ethyl ketone. Stirring was continued for another hour after which the vessel was emptied and the cream coloured polymer was filtered off, washed twice with 300 parts of acetone and finally dried for 16 hours at 50° C. under vacuum. The yield of white powder was 312 parts and it had an inherent viscosity of 1.36 as determined on a 0.1% solution in p-chlorophenol containing 2% of α-pinene.

In order to remove homopolymer and unstable oxymethylene hydroxyl end groups from the copolymer and any catalyst residues, 200 parts of the polymer were dissolved in 2,400 parts of methanol, 1,600 parts of water and 40 parts of "880" ammonia at 150° C. in a stirred autoclave. After treatment the mixture was rapidly cooled. The resulting precipitate was washed with water and dried at 60° C. under vacuum for 16 hours and readily divided into 120 parts of fibrous material and 60 parts of powder. The fibrous material had an inherent viscosity of 1.4 and the powder an inherent viscosity of 0.3 and analysis showed that the former contained 1.3 mole percent, and the latter 1.8 mole percent of butene formal residues. The fibrous polymer had a breakdown rate at 222° C. of 0.1% per minute and a melt flow index (at 190° C. and a load of 2 kilograms) of 6.9. It was compounded at 170° C. on open rolls with antioxidants and compression moulded at 180° C. to give tough, flexible white fibres 0.015 inch thick having the following tensile properties:

| Rate of elongation | Max. Stress (p.s.i.) | Percent Elongation at Break |
|---|---|---|
| 18 inches/minute | 10,000 | 20 |
| ½ inch/minute | 8,200 | 16 |

Strong fibres could be melt-spun from the sample at 190° C.

A sample of the fibrous polymer was completely hydrolysed with concentrated hydrochloric acid and the resultant but-2-ene-1,4-diol was titrated for ethylenic unsaturation against a 0.002 molar solution of bromide and bromate to an amperometric end point. It was found that the diol lost its unsaturation at the rate of 0.4% per hour upon standing in a mixture of formaldehyde and concentrated hydrochloric acid and therefore the bromide/bromate solution was standardised against a but-2-ene-1,4-diol sample that had stood in the same environment for the same time as the test sample.

By this method, the copolymer was found to contain 3.6% by weight of but-2-ene-1,4-diol residues, equivalent to 1.63% molar.

Example VII 48.6 parts of trioxane were dried by refluxing with sodium metal for 24 hours and then adding a little benzophenone and continuing heating for 4 hours until a deep blue colour persisted. Distillation from this mixture gave trioxane containing 0.02% by weight of water as measured by the intensity of the O—H stretching absorption band at 2.71 microns wavelength in the Infra-red. A solution of this trioxane in 49 parts of dry cyclohexane and 3.24 parts of dry butene formal was stirred at 61° C. and 0.0109 part ferric chloride in 0.71 part dry ether was injected into the mix. After 3 hours the resultant thick mixture was filtered and the residue was washed with acetone, dilute hydrochloric acid and water and dried at 60° C. under vacuum for 16 hours. 13 parts of a cream powder were obtained. On heating with aqueous methanolic ammonia at 150° C. under pressure followed by washing and drying, 11 parts of very stable polymer were obtained.

Example VIII

A solution of 47.2 parts of trioxane (which had been dried by distillation from calcium hydride) in 47 parts of dry methylene chloride and 3.15 parts of butene formal was stirred at 35° C. and a solution of 0.0324 part of boron trifluoride di-n-butyl etherate in 2.34 parts of cyclohexane was added. After 24 hours 0.1 part of tri-n-butylamine was added. The white powder was filtered off, washed with acetone and dried to yield 20.5 parts of the polymer. The residue after treatment with aqueous methanolic ammonia at 155° C. under pressure was found to have a breakdown rate at 222° C. of 0.08% per minute. Strong fibres could be spun from the molten polymer at 190° C.

Example IX

To a melted mixture of 35.8 parts of trioxane and 2.4 parts of butene formal at 70° C. was added a solution of 0.0129 part of FeCl₃ in 0.71 part of dry ether. After 15 minutes the reaction mixture was solid and it was ground up with acetone to extract unreacted trioxane, washed with dilute hydrochloric acid and finally washed with water. The pale cream powder was dried at 65° C. under vacuum to yield 15.9 parts of polymer. Upon heating under pressure at 150° C. with aqueous methanolic ammonia, the product lost 13% of its weight leaving a polymer which had a breakdown rate at 222° C. of 0.04% per minute.

Example X

A solution of 46.7 parts of dry trioxane and 3.11 parts of butene formal was prepared at 60° C. in 47 parts of dry benzene. To this stirred solution was added a solution of 0.012 part of boron trifluoride di-n-butyl etherate in 0.73 part of ether. After 3 hours, 11–25 parts of copolymer were obtained. After destroying catalyst residues and unstable polymer by ammonia treatment, the polymer had a 222° breakdown rate of 0.05% per minute.

Example XI

A mixture of 2.94 parts of dry 2-isopropyl-1,3-dioxep-5-ene and 41.1 parts of dry trioxane was prepared at 73° C. To the melt was added a solution of 0.01 part of boron trifluoride diethyl etherate in 0.73 part of dry diethyl ether. An immediate pink colour developed which changed to green when polymer was deposited after about 5 minutes and after 20 minutes the mixture was solid. The polymer was ground up with acetone and then heated at 150° C. in a pressure vessel for ½ hour with 400 parts of methanol, 400 parts of water and 5 parts of "880" ammonia. After washing well with hot water to remove the hexamethylene tetramine formed and drying the product for 16 hours at 60° C. in vacuum, 15.4 parts of white polymer were obtained. This polymer had a first order rate constant for loss in weight at 222° C. of 0.024% per minute up to 90 minutes. Its melting range was from 144° to 152° C. Infra-red analysis showed the presence of unsaturation in the polymer equivalent to about 1.5 mole percent of 2-isopropyl 1,3-dioxep-5-ene.

Strong fibres could be spun from the molten polymer at 190° C.

Example XII 59 parts of pure dry trioxane and 4.2 parts 2-isopropyl-1,3-dioxep-5-ene were dissolved in 59 parts of dry cyclohexane. The solution was stirred under nitrogen at 61° C. and a solution of 0.0363 part of boron trifluoride di-n-butyl etherate in 2.34 parts of cyclohexane was added. The solution became green immediately and polymer began to form after 1 hour. The polymerization was allowed to continue for 18 hours and was then terminated by the addition of 0.1 part of tri-n-butylamine. The cream powder was filtered off, washed well with acetone and dried at 60° C. in vacuum giving 10.7 parts of polymer. On heating 10 parts of this product with aqueous methanolic ammonia at 150° C., 7.4 parts of copolymer having a breakdown rate at 222° C. of 0.11% per minute were obtained.

Example XIII

A series of polymerisations between trioxane and 1,3-dioxep-5-ene were carried out in the absence of solvent and using boron trifluoride diethyl etherate as catalyst. The properties of the polymers formed are set out below.

| | But-2-ene diol residues in polymer [1] (mole percent) | Melting range (° C.) | Rate of loss in weight at 222° C. |
|---|---|---|---|
| Experiment: | | | |
| A | 2.1 | 150-155 | 0.05 |
| B | 3.5 | 147-154 | 0.05 |
| C | 4.2 | 132-146 | 0.005 |
| Check | 0 | 170 | 3.8 |

[1] Measured by infrared analysis.

Example XIV

The process of Example I was repeated using 7.8 parts of 4,4,7,7-tetramethyl-1,3-dioxep-5-ene as the comonomer in place of 1,3-dioxep-5-ene. The crude polymeric product was worked up by the process described in Example I and pressed to give a film having a melting range of 142° C. ($T_{50}$) to 161° C. ($T_m$).

Example XV

The process of Example I was repeated using 4.6 parts of 4,7-dimethyl-4,7-diethyl-1,3-dioxep-5-ene as the comonomer in place of 1,3-dioxep-5-ene. The crude polymeric product was worked up as described in Example I to give a film having a melting range of 136° C. ($T_{50}$) to 150° C. ($T_m$).

We claim:
1. A thermoplastic molding material suitable for film and fiber manufacture, which comprises a random copolymer of trioxane and a cyclic ether having the structure

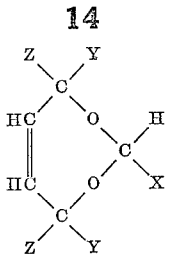

in which X is selected from the group consisting of hydrogen and isopropyl, Y is selected from the group consisting of hydrogen and methyl and Z is selected from the group consisting of hydrogen, methyl and ethyl, which copolymer: (1) is made using an electrophilic catalyst, (2) has an ultimate melting point of at least 146° C. and a melting range of at least 6 deg. C, (3) is free from terminal —O.CH$_2$.OH groups, and (4) consists of 95–98.5 mole percent of —O.CH$_2$— units together with randomly distributed —O.CHX.O.CYZ.CH:CH.CYZ— units in the polymer chain.

2. A material according to claim 1 which comprises a random copolymer of trioxane and 1,3-dioxep-5-ene.

3. A copolymer of trioxane and a cyclic formal of an unsaturated dihydric alcohol having 4 to 10 carbon atoms, said copolymer having olefinic double bonds in the main chain and consisting of 80 to 99.9 mole percent of —O.CH$_2$— units and 0.1 to 20 mole percent of units other than —O.CH$_2$— derived from the cyclic formal.

References Cited

UNITED STATES PATENTS

| | | | |
|---|---|---|---|
| 2,870,097 | 1/1959 | Pattison | 260—67 |
| 3,027,352 | 3/1962 | Walling et al. | 260—67 |
| 3,194,788 | 7/1965 | Kullmar et al. | 260—67 |
| 3,210,297 | 10/1965 | Fischer et al. | 260—67 |

FOREIGN PATENTS 807,589  1/1959  Great Britain.

WILLIAM H. SHORT, *Primary Examiner.*

L. M. PHYNES, *Assistant Examiner.*